United States Patent [19]

Hess

[11] Patent Number: 5,425,642
[45] Date of Patent: Jun. 20, 1995

[54] METHOD OF SPELLING OUT A WORD BEFORE AN AUDIENCE

[76] Inventor: Robert J. Hess, 18 Troon Ct., Lincroft, N.J. 07738

[21] Appl. No.: 187,104

[22] Filed: Jan. 25, 1994

[51] Int. Cl.⁶ ............................................. G09B 19/04
[52] U.S. Cl. ........................................................ 434/167
[58] Field of Search .................. 434/128, 167, 156; 273/272, 439, 299

[56] References Cited

U.S. PATENT DOCUMENTS

| | | | |
|---|---|---|---|
| 3,746,342 | 7/1973 | Fine | 273/272 X |
| 4,519,606 | 5/1985 | Lussiez | 434/167 X |
| 5,057,915 | 10/1991 | Von Kohorn | 273/439 X |
| 5,133,560 | 7/1992 | Small | 434/167 X |
| 5,133,665 | 7/1992 | Engel et al. | 434/167 |
| 5,207,435 | 5/1993 | Tanner | 273/272 X |
| 5,255,925 | 10/1993 | Small | 434/167 X |

OTHER PUBLICATIONS

"2 in 1-A Word Search/Crossword Puzzle" by Merl Reagle, Games (Magazine), Jan./Feb. 1981, p. 41 (Puzzle Solution: p. 70).

*Primary Examiner*—Gene Mancene
*Assistant Examiner*—Jeffrey A. Smith
*Attorney, Agent, or Firm*—Robert J. Hess

[57] ABSTRACT

Capturing the attention of the audience by having them watch letters being arranged on a blackboard in what appears to be a completely random, jumbled manner as words germane to the topic of discussion are enunciated, and then seeing those letters combined, perhaps with a few filler letters, to spell out yet another word which also is germane to the topic of discussion.

18 Claims, No Drawings

METHOD OF SPELLING OUT A WORD BEFORE AN AUDIENCE

BACKGROUND OF THE INVENTION

1. Field of the Invention

The present invention relates to a method of introducing a topic of discussion to an audience so as to capture their attention.

2. Discussion of the Related Art

When speaking before an audience, the opening sets the tone for the remainder of the speech; it is during this time that the audience is most attentive. If one loses the audience during the opening, it is an uphill struggle to capture their attention again. Speeches, by their very nature, are passive in that they spew forth information to the audience; the audience seldom is compelled to participate unless directly asked to do so by the speaker. As a result, it becomes easy for the audience to tune out the speaker and fail to pay close attention to the speech. The attention of some members of the audience may be easily distracted.

A lot can be learned from game shows. They are designed to capture the attention of the audience. Some shows reveal letters in a string of hidden letters which make up a word as they are guessed by the contestant and allow the contestant to guess the word at any time. Usually prizes are awarded for a successful guess. One key to the success of game snows is that they compel the audience to participate on their own as if they were the contestant trying to win prizes.

It would be desireable to devise a technique which ensures capturing the audience's attention if applied to the opening of a speech or when presenting a new topic of discussion.

SUMMARY OF THE INVENTION

The present invention is directed at enunciating words germane to a topic of discussion, displaying at least one letter found in each of those words after each word is enunciated, arranging the letters relative to each other during the displaying for spelling out a different word that is germane to the topic of discussion and filling in any missing letters in that different word.

DESCRIPTION OF THE PREFERRED EMBODIMENT

Consider a situation in which a speaker is before an audience and is to give a discussion concerning intellectual property. A blackboard is behind the speaker.

The speaker asks the audience to name different types of intellectual property or else enunciates each different type himself. The words "patents", "copyrights", "trademarks", "trade secrets" and "unfair competition" are enunciated, either by the audience or the speaker. After each word is enunciated, the speaker writes the first letter of each word on the blackboard in what appears to be a jumbled order to the audience. However, the speaker is actually arranging them in a predetermined order that will have significance shortly to the audience. The arrangement is: C P C TS The first "C" is the first letter in "copyrights", the "P" is the first letter in "patents", the next "C" is the first letter in "competition" as in "unfair competition", the "T" is the first letter in "trademarks" and the "S" is the first letter in "secrets" as in "trade secrets".

The order in which the words are spoken makes no difference; the relative position of the string of letters will be written out by the speaker in the same way each time. To the audience, the arrangement C P C TS seems to have no significance to the topic under discussion other than that each letter is the first letter of some germane word that was just mentioned.

For instance, if the enunciated sequence is "trademarks" "patents" "copyrights" "trade secrets" "unfair competition", the audience sees the following lettering sequence appear:

|   |   |   | T  |
|---|---|---|----|
|   | P |   | T  |
|   | P | C | T  |
|   | P | C | TS |
| C | P | C | TS |

The term "display" encompasses any form of showing the letters one by one to the audience, whether through writing with chalk, raising a respective cover hiding each of the letters, rotating a double-faced piece to reveal hidden letters on their opposite sides, or actuating electronic media or mechanical devices to generate appropriate letters for display. In short, the letters are revealed or displayed one by one from a hidden string of such letters or else written out by the speaker.

Next, the speaker asks what these types of intellectual property have in common with respect to who they are designed to protect against. In response, the speaker or audience eventually enunciates the word "COPYCATS", a different word germane to this common topic. This different word was not one of the words previously enunciated from which letters were taken. The speaker spells out that different word by using the letters already on the blackboard. If necessary, filler letters are added to complete the spelling of the different word. In this example, the letters "O", "Y" and "A" are filled in the appropriate locations in "C P C TS" to spell out the word "COPYCATS".

This technique has application to topics of discussion other than intellectual property. The basic idea is to capture the attention of the audience by having them watch letters being arranged on a blackboard in what appears to be a completely random, jumbled manner as words germane to the topic of discussion are enunciated, and then seeing that those letters when combined in the same order in which they are displayed, perhaps with a few filler letters, spell out yet another word which also is germane to the topic of discussion.

Further, the technique is not limited to speeches for live audiences. The speeches may be recorded for future playback before audiences. The invention has application in commercials where the audience is the general public watching television or other entertainment media. In addition, the technique could be employed in a game show or a group game—the contestants or players must guess the word being spelled out in addition to the words germane to the same topic as the spelled out word. Filler letters may be revealed in advance.

When a speaker is nervous, the length of the word to be spelled out may be too long for the speaker to remember the relative position of all the letters. To avoid potential mistakes, the speaker should try to relate the relative order of the middle letters of the word being spelled out (without the fillers) to something familiar. For instance, most intellectual property practitioners know that the letters PCT stand for Patent Cooperation Treaty. Thus, if the speaker remembers PCT in connection with COPYCATS, the relative position of the letters "P", "C" and "T" in COPYCATS becomes easier to recall when in front of an audience than if the speaker could only rely on remembering the proper spelling of the longer word COPYCATS.

What is claimed is:

1. A method of spelling out a word before an audience, comprising the steps of:

communicating to an audience a plurality of words germane to a common topic;

displaying at least one string of letters each of said letters being found in a respective one of said words;

arranging the letters relative to each other during the step of displaying so that a different word may be spelled out with the letters as arranged, the different word being germane to the common topic; and spelling out the different word with those letters as arranged.

2. A method as in claim 1, wherein the step of communicating includes enunciating words germane to intellecutual property as the common topic, the step of spelling including spelling out the different word which contains in order at least the letters C, O, P, Y, C, A, and T.

3. A method as in claim 1, further comprising the step of recording the steps of communicating, displaying, arranging and spelling for subsequent playback of the recording.

4. A method as in claim 3, further comprising the step of playing back the recording as part of any one of a commercial, game show, group game and speech before an audience.

5. A method as in claim 1, further comprising the step of carrying out the steps of communicating, displaying, arranging and spelling as part of any one of a commercial, game show, group game and speech before an audience.

6. A method as in claim 1, further comprising the step of filling in additional letters where appropriate to complete a spelling of the different word.

7. A method of spelling out a word before an audience, comprising the steps of:

soliciting an audience to communicate a plurality of words germane to a common topic;

displaying at least one string of letters each of said letters being found in a respective one of said words;

arranging the letters relative to each other during the step of displaying so that a different word may be spelled out with the letters as arranged, the different word being germane to the common topic; and spelling out the different word with those letters as arranged.

8. A method as in claim 7, wherein the step of soliciting includes causing members of the audience to enunciate words germane to intellecutual property as the common topic, the step of spelling including spelling out the different word which contains in order at least the letters C, O, P, Y, C, A, and T.

9. A method as in claim 7, further comprising the step of recording the steps of soliciting, displaying, arranging and spelling for subsequent playback of the recording.

10. A method as in claim 9, further comprising the step of playing back the recording as part of any one of a commercial, game show, group game and speech before an audience.

11. A method as in claim 7, further comprising the step of carrying out the steps of soliciting, displaying, arranging and spelling as part of any one of a commercial, game show, group game and speech before an audience.

12. A method as in claim 7, further comprising the step of filling in additional letters where appropriate to complete a spelling of the different word.

13. A method of spelling out a word before an audience, comprising the steps of:

enunciating a plurality of words germane to a common topic; displaying at least one string of letters each of said letters being found in a respective one of said words;

arranging the letters relative to each other during the step of displaying so that a different word may be spelled out with the letters as arranged, the different word being germane to the common topic; and spelling out the different word with those letters as arranged.

14. A method as in claim 13, wherein the step of enunciating includes speaking words germane to intellecutual property as the common topic, the step of spelling including spelling out the different word which contains in order at least the letters C, O, P, Y, C, A, and T.

15. A method as in claim 13, further comprising the step of recording the steps of enunciating, displaying, arranging and spelling for subsequent playback of the recording.

16. A method as in claim 15, further comprising the step of playing back the recording as part of any one of a commercial, game show, group game and speech before an audience.

17. A method as in claim 13, further comprising the step of carrying out the steps of enunciating, displaying, arranging and spelling as part of any one of a commercial, game show, group game, and speech before an audience.

18. A method as in claim 13, further comprising the step of filling in additional letters where appropriate to complete a spelling of the different word.

* * * * *